United States Patent [19]
Serini et al.

[11] 4,172,103
[45] Oct. 23, 1979

[54] POLYCARBONATE MOULDING COMPOUNDS

[75] Inventors: Volker Serini; Wolfgang Cohen, both of Krefeld; Hugo Vernaleken; Günter Perlstöcker, both of Krefeld-Bockum, all of Fed. Rep. of Germany

[73] Assignee: Bayer Aktiengesellschaft, Fed. Rep. of Germany

[21] Appl. No.: 827,103

[22] Filed: Aug. 23, 1977

Related U.S. Application Data

[63] Continuation of Ser. No. 725,887, Sep. 23, 1976, abandoned, which is a continuation of Ser. No. 421,491, Dec. 3, 1973, abandoned.

[30] Foreign Application Priority Data

Jun. 9, 1973 [DE] Fed. Rep. of Germany ....... 2329585

[51] Int. Cl.$^2$ ............................................. C08L 69/00
[52] U.S. Cl. ........................................... 525/76; 260/3; 525/77; 525/80; 525/127; 525/168; 525/165
[58] Field of Search ........................... 260/873, 47 XA

[56] References Cited

U.S. PATENT DOCUMENTS

| 3,239,582 | 3/1966 | Keskula et al. | 260/873 |
| 3,801,673 | 4/1974 | O'Connell | 260/873 |
| 3,879,347 | 4/1975 | Serini et al. | 260/47 XA |

FOREIGN PATENT DOCUMENTS

| 1561518 | 2/1969 | France | 260/47 |
| 910033 | 11/1962 | United Kingdom | 260/873 |

*Primary Examiner*—Theodore E. Pertilla
*Attorney, Agent, or Firm*—Connolly and Hutz

[57] ABSTRACT

Thermoplastic moulding compounds of
1. 10–95% by weight of an aromatic polycarbonate in which at least 50% of the linear chains comprise recurrent structural units of the formula

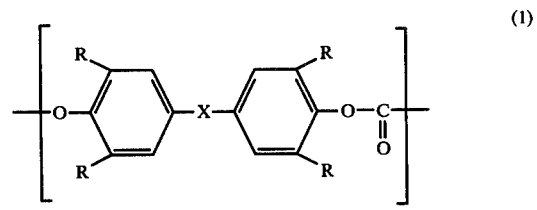

(1)

in which R represents $C_1$–$C_3$ alkyl and X represents a single bond, —O—, —CO—, —SO$_2$—, $C_1$–$C_{10}$ alkylene, $C_1$–$C_{10}$ alkylidene, $C_5$–$C_{15}$ cycloalkylene, $C_5$–$C_{15}$ cycloalkylidene or

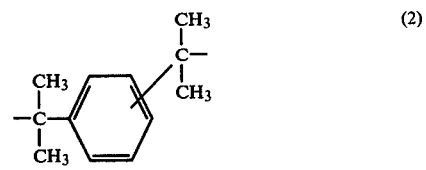

(2)

2. 5–90% by weight of a thermoplastic resin and/or
3. 5–90% by weight of rubber which may be modified.

12 Claims, 1 Drawing Figure

U.S. Patent  Oct. 23, 1979  4,172,103

POLYCARBONATE MOULDING COMPOUNDS

CROSS-REFERENCE TO RELATED APPLICATION

This application is a continuation of application Ser. No. 725,887 filed Sept. 23, 1976 and now abandoned which in turn is a continuation of application Ser. No. 421,491 filed Dec. 3, 1973 and now abandoned.

This invention relates to thermoplastic moulding compounds comprising
(1) 10–95% by weight of an aromatic polycarbonate the linear chains of which contain at least 50% of structural units of the formula in which R represents a $C_1$–$C_3$ alkyl group and X represents a single bond, —O—, —CO—, —$SO_2$—, $C_1$–$C_{10}$ alkylene, $C_1$–$C_{10}$ alkylidene, $C_5$–$C_{15}$ cycloalkylene, $C_5$–$C_{15}$ cycloalkylidene or (2) 5–90% by weight of a thermoplastic resin and/or
(3) 5–90% by weight of rubber which may be modified.

These moulding compounds are resistant to saponification and have high heat distortion temperatures.

Polycarbonates which contain recurrent units of formula (1) are known in the art. They have been described in German Offenlegungsschriften Nos. 2,063,050; 2,063,052; 1,570,703; 2,211,957; 2,211,956; and 2,248,817 and in French Pat. No. 1,561,518. They are basically prepared in known manner from o,o,o',o'-tetraalkyl-substituted bisphenols and phosgene. If bisphenols which are not o,o,o',o'-tetraalkyl-substituted are also added, then so-called mixed polycarbonates are obtained in which only a proportion of the structural units, in the case of the invention at least 50%, is o,o,o',o'-tetraalkyl-substituted.

Mixtures of polycarbonates which contain recurrent structural units of formula (1) and polycarbonates based on bisphenols which are not o,o,o',o'-tetraalkyl-substituted may be used instead of these mixed polycarbonates if the total proportion of o,o,o',o'-tetraalkyl-substituted structural units in the mixture is not less than 50%.

The polycarbonates which contain recurrent structural units of formula (1) are exceptionally stable to hydrolysis, saponification and aminolysis and have very high second order transition temperatures.

Some of their properties, however, are unsatisfactory for certain purposes. Thus impact strength and notched impact strength are insufficient for some purposes. Processing of polycarbonates is difficult because of their high melt viscosity which requires temperatures of 280°–340° C. Such high temperatures sometimes cause damage to the polymer, e.g. discoloration. Moreover, thermoplastic processing at about 300° C. requires especially constructed equipment.

The polycarbonate units of formula (1) may be derived, e.g. from o,o,o',o'-tetramethyl-substituted bisphenols such as:
bis-(3,5-dimethyl-4-hydroxyphenyl),
bis-(3,5-dimethyl-4-hydroxyphenyl)-ether,
bis-(3,5-dimethyl-4-hydroxyphenyl)-carbonyl, acrylonitrile
bis-(3,5-dimethyl-4-hydroxyphenyl)-sulphone,
bis-(3,5-dimethyl-4-hydroxyphenyl)-methane,
1,1-bis-(3,5-dimethyl-4-hydroxyphenyl)-ethane,
1,1-bis-(3,5-dimethyl-4-hydroxyphenyl)-propane,
2,2-bis-(3,5-dimethyl-4-hydroxyphenyl)-propane,
2,2-bis-(3,5-dimethyl-4-hydroxyphenyl)-butane,
2,4-bis-(3,5-dimethyl-4-hydroxyphenyl)-2-methyl butane,
2,4-bis-(3,5-dimethyl-4-hydroxyphenyl)-butane,
3,3-bis-(3,5-dimethyl-4-hydroxyphenyl)-pentane,
3,3-bis-(3,5-dimethyl-4-hydroxyphenyl)-hexane,
4,4-bis-(3,5-dimethyl-4-hydroxyphenyl)-heptane,
2,2-bis-(3,5-dimethyl-4-hydroxyphenyl)-octane,
2,2-bis-(3,5-dimethyl-4-hydroxyphenyl)-nonane,
2,2-bis-(3,5-dimethyl-4-hydroxyphenyl)-decane,
1,1-bis-(3,5-dimethyl-4-hydroxyphenyl)-cyclohexane,
1,4-bis-(3,5-dimethyl-4-hydroxyphenyl)-cyclohexane,
$\alpha,\alpha'$-bis-(3,5-dimethyl-4-hydroxyphenyl)-p-diisopropyl benzene
$\alpha,\alpha'$-bis-(3,5-dimethyl-4-hydroxyphenyl)-m-diisopropyl benzene.

Among the bisphenols on which the polycarbonate units of formula (1) may be based, the following are particularly preferred:
bis-(3,5-dimethyl-4-hydroxyphenyl)-methane,
2,2-bis-(3,5-dimethyl-4-hydroxyphenyl)-propane,
2,4-bis-(3,5-dimethyl-4-hydroxyphenyl)-2-methyl butane,
1,1-bis-(3,5-dimethyl-4-hydroxyphenyl)-cyclohexane and
$\alpha,\alpha'$-bis-(3,5-dimethyl-4-hydroxyphenyl)-p-diisopropyl benzene.

Bisphenols which are not o,o,o',o'-tetraalkyl-substituted, but are useful for producing so-called mixed polycarbonates or polycarbonates without o,o,o',o'-tetraalkyl-substituted structural units are for example:
hydroquinone,
resorcinol,
dihydroxy diphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones,
$\alpha,\alpha'$-bis-(hydroxyphenyl)-diisopropyl -(hydroxyphenyl)-diisopropyl benzenes
and the corresponding compounds which are alkylated or halogenated in the nucleus. These and other suitable aromatic dihydroxy compounds have been described in U.S. Pat. Nos. 3,028,365; 2,999,835; 3,148,172; 3,271,368; 2,991,273; 3,271,367; 3,780,078; 3,014,891 and 2,999,846 and in German Offenlegungsschrift No. 1,570,703.

The following are particularly preferred:

2,2-bis-(4-hydroxyphenyl)-propane,
2,2-bis-(3,5-dichloro-4-hydroxyphenyl)-propane,
2,2-bis-(3,5-dibromo-4-hydroxyphenyl)-propane and
α,α'-bis-(4-hydroxyphenyl)-p-diisopropyl benzene.

The polycarbonates may also be branched by the incorporation of small quantities of polyhydroxyl compounds, e.g. 0.05–2.0 mols-% (based on the quantity of bisphenols used). Branched polycarbonates have been described, for example, in German Offenlegungsschriften Nos. 1,570,553; 2,116,974 and 2,113,347; in British Pat. Nos. 885,442 and 1,079,821 and in U.S. Pat. No. 3,544,514. Examples of polyhydroxyl compounds which effect branching are:
phloroglucinol, 4,6-dimethyl-2,4,6-tri-(4-hydroxyphenyl)-heptene-(2),
4,6-dimethyl-2,4,6-tri-(4-hydroxyphenyl)-heptane,
1,3,5-tri-(4-hydroxyphenyl)-benzene, 1,1,1-tri-(4-hydroxyphenyl)-ethane, tri-(4-hydroxyphenyl)-phenyl-methane,
2,2,-bis-[4,4-(4,4'-dihydroxydiphenyl)-cyclohexyl]-propane,
2,4-bis-(4-hydroxyphenyl-4-isopropyl)-phenol,
2,6-bis-(2'-hydroxy-5'-methyl-benzyl)-4-methyl-phenol,
2,4-dihydroxybenzoic acid, 2-(4-hydroxyphenyl)-2-(2,4-dihydroxyphenyl)-propane and 1,4-bis-(4',4''-dihydroxytriphenyl-methyl)-benzene.

The polycarbonates generally have molecular weights $\overline{M}_w$ ranging from 10,000 to over 200,000, preferably from 20,000 to 60,000.

Thermoplastic resins for the purpose of this invention are in particular homopolymers and copolymers of olefinically unsaturated monomers. Preferred monomers are:
(1) Styrene and its derivatives such as α-methylstyrene, α-chlorostyrene, p-chlorostyrene, 2,4-dichlorostyrene, p-methylstyrene, 3,4dimethylstyrene, o- and p-divinyl benzene, p-methyl-α-methylstyrene and p-chloro-α-methylstyrene.
(2) Acrylic and methacrylic acids and their derivatives, e.g. nitriles and esters, preferably alkyl esters such as acrylic and methacrylic acid, acrylonitrile, methacrylonitrile, methyl acrylate, ethyl acrylate, n-propyl and isopropyl acrylate, n-butyl and isobutyl acrylate, 2-ethylhexyl acrylate, methyl methacrylate, ethyl methacrylate, n-propyl and isopropyl methacrylate, n-butyl and isobutyl methacrylate, cyclohexyl methacrylate and isobornyl methacrylate.
(3) Maleic acid anhydride.

The thermoplastic resins may be homopolymers or copolymers of monomers of group (1) and/or of monomers of group (2). Maleic acid may in all cases be used as additional monomer but may not be used on its own.

Thermoplastic resins which are obtained by polymerisation of a monomer or copolymerisation of several monomers of group (1) or by copolymerisation of one or several monomers of group (1) and one or several monomers of group (2), to which maleic acid anhydride may be added, are preferred. Resin-like polymers obtained from styrene, which may be partly or completely replaced by α-methyl styrene, and 0–50 percent by weight of the other styrene derivatives mentioned above are particularly preferred. Other suitable thermoplastic resins include the copolymers obtained from 30–95% by weight of styrene and/or one of the above mentioned styrene derivatives and 5–70% by weight of the above mentioned acrylic and/or methacrylic compounds.

Among the particularly preferred polymers, those which are especially important are the polymers of styrene, the copolymers of 20–95 percent by weight of styrene and 5–80 percent by weight of α-methyl styrene, and the copolymers of 30–95 percent by weight of styrene and/or α-methyl styrene and 5–70 percent by weight of acrylonitrile and/or methacrylonitrile and/or methyl methacrylate.

The following are examples of suitable resins: polystyrene (PS), polymethyl methacrylate (PMMA), styrenemethyl styrene copolymers (SMS), styrene-acrylonitrile copolymers (SAN), styrene-maleic acid anhydride copolymers, styrene-methyl methacrylate copolymers and acrylonitrilemethyl methacrylate copolymers (AMMA).

The thermoplastic resins may be produced by the known methods of radical polymerisation, e.g. by bulk polymerisation or polymerisation in solution or in emulsion or by a combined process such as a combination of solution and precipitation or bulk and suspension processes. Polymerisation processes carried out with the aid of organometallic mixed catalysts (Ziegler-Natta-catalysts) are also known.

The term "rubbers" in the present context is understood to include natural rubber and synthetic rubbers. Polyurethane rubber, ethylene/vinyl acetate rubber, silicone rubber and polyether rubbers rubbers examples of suitable synthetic rubbers. The preferred rubbers include polypentenamer rubber and ethylene-propylene-diene rubber (the diene being e.g. hexadiene-1,5-norbornadiene-ethylidene-norbornene) as well as so-called diene rubbers, i.e. homopolymers of conjugated dienes having 4 to 8 carbon atoms, such as butadiene, isoprene, piperylene and chloroprene, copolymers of such dienes with each other and copolymers of these dienes with styrene, acrylic or methyacrylic acids or derivatives thereof (e.g. acrylonitrile, methacrylonitrile, acrylic acid, methacrylic acid, butyl acrylate and methyl methacrylate) or isobutylene. Butadiene, butadiene/styrene, butadiene/methyl methacrylate, butadiene/butyl acrylate, ethylene/propylene/diene, polypentenamer and butadiene/acrylonitrile rubbers are particularly preferred; these rubbers may also contain in copolymerised from small amounts of other monomers, e.g. divinyl benzene and methacrylic acid in the case of the last mentioned rubber.

"Modified rubbers" are understood to be graft copolymers obtained by polymerising monomers from group (1) or group (2) or groups (1) and (2) in the presence of the rubber, optionally together with maleic acid anhydride.

Particularly preferred groups of such graft polymers are obtained by polymerising (a) styrene, α-methyl styrene or mixtures thereof, (b) 0–50% by weight (based on total monomers) of the other above mentioned styrene derivatives in the presence of butadiene, butadiene/styrene, butadiene/methyl methacrylate, butadiene/butyl acrylate, ethylene/propylene/diene, polypentenamer or butadiene/acrylonitrile rubbers (which may also contain in copolymerised from small amounts of other monomers). Other particularly preferred graft polymers are obtained by polymerising 30–95% by weight of styrene and/or one of the above mentioned styrene derivatives and 5–70% by weight of the above mentioned acrylic and/or methacrylic compounds, (% by weight based on the sum of monomers) in the presence of the above mentioned rubbers.

Among the particularly preferred graft polymers, those which are obtained by polymerising styrene or by polymerising 20–95 percent by weight of styrene and 5–80 percent by weight of α-methyl styrene (percent by weight based on the sum of monomers) or 30–95 percent by weight of styrene and/or α-methyl styrene and 5–70 percent by weight of acrylonitrile and/or methacrylonitrile and/or methyl methacrylate (percent by weight based on the sum of monomers) in the presence of the above mentioned rubbers are particularly important.

The polymer mixtures according to this invention may be prepared by various methods. For instance the polymeric constituents may all be dissolved together in a solvent or solvent mixture. Upon precipitation of the polymers by the addition of a non-solvent or dropwise addition of the solution into a precipitating agent or by evaporating off the solvent the mixture is obtained directly.

Also some individual polymers may be mixed separately before all the components are finally mixed together. Thus for example latices of a resinous copolymer (e.g. styrene/acrylonitrile copolymer) and of a rubber (e.g. butadiene/acrylonitrile copolymer) may be mixed by joint precipitation before they are blended with the polycarbonate to form the final moulding compound.

On the other hand, the polymers used as starting materials may also be mixed as solvent-free melts in mixing apparatus such as extruders, internal kneaders and mixing rollers. Mixing may also be achieved by preparing some polymers which are to be constituents of the mixture in the presence of other polymers, in which case at least partial grafting may occur on the high-molecular weight polymers in whose presence the other polymers are prepared. Thus for example radical polymerisation of styrene may be carried out in the presence of polycarbonate and polybutadiene. This polymerisation may be carried out by various known methods (solution, bulk, bead, emulsion, and precipitation polymerisation).

The rubber component in the polymer mixtures of the invention generally forms a separate phase which is finely divided in the polymer matrix. The rubber may be present in the form of separate globlets or conglomerations of several globlets or in the form of other regular or irregular particles and conglomerations of particles or in the form of particles which form a network in which other polymers may be embedded. The particle diameter is generally 0.01–20 μm, preferably 0.03–10 μm. Particles may be of one or of several types depending on the method of preparing the polymer mixture and the selection of its components; the particles may differ considerably from each other in shape, size and size distribution. Because of physical differences in the rubber phase, polymer mixtures containing the same amount of rubber and having similar composition may yet have different properties, e.g. different toughness, weld line strength and surface gloss. Thus, for example, the surface gloss of injection mouldings is better if the rubber particles are very small and, conversely, both toughness and weld line strength are better if the rubber phase contains coarser particles (see Example 5).

Particularly high weld line strength is obtained if the rubber particles are very irregular in size and shape, as for example with non-grafted rubber (see Example 10). Very high weld line strength is also observed with rubber particles in network form as in the case of solvent-free bead graft polymerisation (see Example 10). It is also very advantageous if the rubber is distributed in the form of agglomerates, e.g. agglomerates of very small rubber globlets, because this results not only in a very high weld line strength but also makes it possible for a very high gloss to be obtained (see Example 10).

The properties of the polymer mixtures are determined not only by the nature of the rubber phase but also by the total rubber content. In two samples having the same type of rubber phase, for example, toughness and weld line strength increase with increasing rubber content while the elastic modulus decreases (see Examples 5 and 10).

While the rubber generally forms a separate phase in the polymer mixtures of this invention, the other polymer constituents of the mixture may form one single phase in which the different polymers are distributed practically as molecular dispersions or they may form several phases each of which may comprise a practically molecularly dispersed mixture of several polymers.

Compared with known polymer mixtures such as those of polycarbonates based on 2,2-bis-(4-hydroxyphenyl)-propane and styrene, butadiene/styrene, acrylonitrile/butadiene/styrene and methyl methacrylate/butadiene/styrene polymers (see U.S. Pat. Nos. 3,239,582; 3,130,177 and 3,162,695 and German Offenlegungsschriften Nos. 1,109,884 and 1,170,141), the moulding compounds according to the invention have unexpectedly advantageous properties which are partly due to the exceptionally high compatibility of the components.

An example to illustrate this is provided by the mixtures of polycarbonate of 2,2-bis-(3,5-dimethyl-4-hydroxyphenyl)-propane with polystyrene, which are completely homogeneous, transparent and monophasic in all proportions as can be demonstrated by differential thermoanalysis (see Example 3). Another example is provided by the completely homogeneous, monophasic mixtures of styrene/maleic acid anhydride copolymers and polycarbonate of 2,2-bis-(3,5-dimethyl-4-hydroxyphenyl)-propane. Mixtures of 2,2-bis-(4-hydroxyphenyl)-propane polycarbonate and polystyrene, however, comprise two phases. Not all polymer mixtures of this invention have only one polymer phase in addition to the rubber phase. But when a plurality of individual polymer phases is present all phases are sufficiently compatible to yield mixtures having excellent properties. The exceptionally good compatibility is also apparent on inspection of fractured surfaces of test samples. The fracture varies in texture from smooth to shell-like but is not scale-like as with incompatible polymers.

The exceptionally good compatibility of the components in the moulding compounds of this invention is also apparent from the unexpectedly high weld line strength. Thus for example mixtures of polycarbonate based on 2,2-bis-(3,5-dimethyl-4-hydroxyphenyl)-propane and ABS-polymers have weld line strengths of e.g. 7–29 cm.kp./cm$^2$, values which are equal to or even higher than those of corresponding mixtures of polycarbonate based on 2,2-bis-(4-hydroxyphenyl)-propane (see Examples 7, 11 and 13). Furthermore, mixtures, e.g. of polycarbonate based on 2,2-bis-(3,5-dimethyl-4-hydroxyphenyl)-propane and polystyrene or butadiene/styrene graft polymers have higher weld line strengths than corresponding mixtures with polycarbonate of 2,2-bis-(4-hydroxyphenyl)-propane (see Examples 7 and 11). This is surprising because the weld line strength of the polycarbonate of 2,2-bis-(3,5-dimethyl-4-hydroxyphenyl)-propane is 13 cm.kp/cm$^2$ and thus practically ten times lower than that of the polycarbonate of 2,2-bis-(4-hydroxyphenyl)-propane, which is 110 cm.kp./cm$^2$.

The moulding compounds according to the invention can be prepared from the individual polymer components at surprisingly low temperatures, a fact which must also be attributed to the good compatibility of these components. Thus for example mixtures of polycarbonate based on 2,2-bis-(3,5-dimethyl-4-hydroxyphenyl)-propane and ABS-polymers can be prepared at the same temperatures which can be used for preparing and processing mixtures of polycarbonate based on 2,2-bis-(4-hydroxyphenyl)-propane and ABS-polymers (220°–250° C.). The reason why this is surprising is that the polycarbonate based on 2,2-bis-(3,5-dimethyl-4-hydroxyphenyl)-propane has a second order transition temperature of 210° C., which is much higher than that of the polycarbonate based on 2,2-bis-(4-hydroxyphenyl)-propane, which is 150° C. (see Examples 6 and 8).

The moulding compounds according to the invention have very high heat distortion temperatures in spite of the relatively low temperatures at which they can be prepared and processed. In some cases, the heat distortion temperature is astonishingly close to that of the polycarbonate itself, e.g. in the case of mixtures of polycarbonate based on 2,2-bis-(3,5-dimethyl-4-hydroxyphenyl)-propane and ABS-polymers. Generally speaking, the heat distortion temperature of the moulding compositions according to the invention is substantially higher than that of comparable known moulding compositions, e.g. those of polycarbonate based on 2,2-bis-(4-hydroxyphenyl)-propane and ABS-polymers (see Examples 1, 3, 6 and 8).

The exceptionally good compatibility of the individual components with each other in the moulding compositions according to the invention can also be recognised by the exceptionally high yield points ($\sigma_s$) in the stress strain diagram. Thus for example, mixtures of polycarbonate based on 2,2-bis-(3,5-dimethyl-4-hydroxyphenyl)-propane and ABS-polymers have higher yield points than comparable mixtures with polycarbonate based on 2,2-bis-(4-hydroxyphenyl)-propane (see Example 6).

The moulding compounds according to the invention are distinguished by their high stability to saponification, e.g. in hot water, steam, hot aqueous alkalis and acids, concentrated aqueous ammonia solutions and amines. Their stability to saponification is far superior to that of comparable moulding compounds, e.g. the compounds of polycarbonate based on 2,2-bis-(4-hydroxyphenyl)-propane and ABS-polymers (see Example 6).

The impact strength and notched impact strength of polycarbonates based on o,o,o',o'-tetramethyl-substituted bisphenols can be considerably improved by mixing these polycarbonates with other polymers according to this invention (see Examples 2, 5, 8 and 13).

The stability to stress cracking of polycarbonates based on o,o,o',o'-tetraalkyl-substituted bisphenols is also substantially raised in the mixtures according to this invention.

The moulding compounds according to the invention also have electrical tracking resistance (see Example 1).

The moulding compositions according to this invention also have high cracking resistances (see Example 1).

The moulding compounds according to this invention are very suitable for processing into moulded products, panels, foils, fibres, coatings, etc. They are also very suitable for use as mixtures with fillers such as minerals, sawdust, carbon black or glassfibres or with decorative elements, dyes, pigments, heat stabilisers, antioxidants, UV-stabilisers and other stabilisers, plasticizers, lubricants, mould-release agents, flame-proofing additives such as halogenated organic compounds, metal oxides, metal salts and organic phosphates, other polymers (e.g. polyolefins and polyamides) and other additives. They are particularly advantageous wherever good electrical insulating properties, high dimensional stability under heat, high resistance to hydrolysis, saponification and aminolysis, great toughness and ease of processing are important. Thus for example, they must advantageously be used for manufacturing pipes for conducting hot alkaline or acid solutions and for manufacturing high-quality seals and packings, cooking utensils, sterilising instruments using superheated steam, washing machine parts, battery boxes, dry cell battery containers, housings and other insulating parts in electrically operated machines, sheets for electrical insulation, saponification-resistant container linings, chemically-resistant and heat-resistant filter cloths and many other articles.

EXAMPLE 1

Mixtures of polycarbonates, copolycarbonates and polycarbonate mixtures with an ABS graft polymer.

Numerous homopolycarbonates, copolycarbonates and polycarbonate mixtures were mixed with an ABS-polymer in proportions by weight of 1:1 in a double screw extruder at 220°–250° C. The ABS-polymer was obtained by grafting 14 parts by weight of acrylonitrile and 36 parts by weight of styrene on 50 parts by weight of polybutadiene by the process of radical emulsion polymerisation. The major part of the butadiene rubber was present in the ABS-polymer as also in the final polymer mixtures in the form of practically spherical particles with a diameter of about 0.3–0.6 μm. The homopolycarbonates, copolycarbonates and polycarbonate mixtures were prepared as described in German Offenlegungsschriften Nos. 2,053,050; 2,063,052; 2,211,957 and 2,248,817 and had molecular weights of about 40,000. The polymer mixtures obtained by mixing the components in the double screw extruder were spun as strands and granulated. The polymer mixtures were so highly fluid that the granulates could easily be injection-moulded at temperatures as low as 230°–260° C. For comparison, samples were also extruded from the polycarbonates and polycarbonate mixtures used for the polymer mixtures, but owing to their high melt viscosity the operating temperature had to be raised to 310°–330° C. before the melt was sufficiently fluid for injection moulding.

The table shows the polycarbonates used for preparing the polymer mixtures and their dimensional stabilities under heat as well as the dimensional stabilities under heat of the polymer mixtures, which are unexpectedly high if one takes into account the low dimensional stability under heat of ABS-polymers (at 90° C.).

The impact strength (according to DIN 53 453) which is less than 40 cm.kp./cm$^2$ in polycarbonates A–H shown in the table and ranges from above 40 to "not broken" in the polycarbonates I–L, rises sharply in the mixtures and in all cases amounts to "not broken". The notched impact strength (according to DIN 53 453) also rises, being less than 7 cm.kp./cm² in all the polycarbonates A–L but rising to the high values of 14–25 cm.kp./cm² in all the mixtures. The good compatibility of the polymers in the mixtures is shown in their high yield points ($\sigma_s$) (according to DIN 53 455) which is between 500 and 800 kp/cm² in all the polymer mixtures. Fracture surfaces of test samples produced from the polymer mixtures are relatively smooth to shell-like; the scale-like fracture which occurs in mixtures of incompatible polymers was not found in any of these cases. The tracking resistance was very high in all the polymer mixtures, i.e. above 560 V (according to DIN 53 480/6 (new), test process KB, test solution F).

Table to example 1: polycarbonate/ABS mixture 50/50 parts by weight:

| Example | Added polycarbonate | Heat distortion according to Vicat A$^\Delta$ (°C.) | |
|---|---|---|---|
| | | Polycarbonate | Polymer mixture |
| a | TMBPF-PC | 185 | 169 |
| b | TMBPA-PC | 200 | 184 |
| c | TMBPB-PC | 195 | 178 |
| d | TMBPZ-PC | 210 | 191 |
| e | TMDKBP-PC | 196 | 184 |
| f | TMBPA/TBBPA-CPC 90/10+ | 211 | 190 |
| g | TMPA/BPA-CPC 70/30+ | 192 | 173 |
| h | TMBPF/TCPBA/BPA-CPC 65/10/25+ | 183 | 165 |
| i | TMDKBP/DKBP-CPC 65/35+ | 181 | 163 |
| j | TMBPA-PC/BPA-PC/-mixture 75/25$^a$ | 193 | 175 |
| k | (TMBPA-PC/BPA-PC-TBBPA-CPC (80/20+)-mixture 60/40$^a$ | 196 | 179 |

ABS-polymer used: 14 parts by weight of acrylonitrile and 36 parts by weight of styrene grafted on 50 parts by weight of polybutadiene (see above).
+ = molar parts, $^a$ = parts by weight, PC = polycarbonate, CPC = copolycarbonate, $^\Delta$ = according to DIN 53 460/A
TMBPF = bis-(3,5-dimethyl-4-hydroxyphenyl)methane
TMBPA = 2,2-bis-(3,5-dimethyl-4-hydroxyphenyl)-propane
TMBPB = 2,4-bis-(3,5-dimethyl-4-hydroxyphenyl)-2-methyl butane
TMBPZ = 1,1-bis-(3,5-dimethyl-4-hydroxyphenyl)-cyclohexane
TMDKBP = α,α'-bis-(3,5-dimethyl-4-hydroxyphenyl)-p-diisopropyl benzene
TBBPA = 2,2-bis-(3,5-dibromo-4-hydroxyphenyl)-propane
TCBPA = 2,2-bis-(3,5-dichloro-4-hydroxyphenyl)-propane

EXAMPLE 2

Mixtures of TMBPA polycarbonate and TMBPB polycarbonate with various polymers which contain rubber.

The polymer mixtures shown in the table were obtained by the method described in example 1.

Table of example 2: polymer mixtures containing 50 parts by weight of polycarbonate

| Example | Polymer added to polycarbonate | Rubber Content (% by weight) | Polymer mixtures Properties | |
|---|---|---|---|---|
| | | | Impact strength (cm.kp./cm²)$^a$ | Notched impact strength (cm.kp./cm²)$^a$ |
| a | +ABS + SA | 16.5 | nb | 16 |
| b | +BA + SA | 9 | nb | 10 |
| c | +BS + S | 12 | nb | 14 |
| d | +TPR/S/A | 5.5 | nb | 7 |
| e | +S/a/B/A | 7.5 | nb | 8.5 |
| f | +none | 0 | 34 | 4 |
| g | °EPDM/A/S | 7 | nb | 8 |
| h | °A/B/S/A | 17.5 | nb | 16 |
| i | °BS | 12.5 | nb | 13 |
| j | °A/B/S/MM | 9 | nb | 10 |
| k | °none | 0 | 31 | 3 |

+ = mixing component TMBPA polycarbonate, ° - mixing component TMBPB polycarbonate, $^a$ = according to DIN 53 nb - not broken, $^\Delta$ = only from rubber-forming mnomers, e.g. the proportion of rubber in butadiene/acrylonitrile rubber (butadiene/acrylonitrile 65/35 parts by weight) is 65 percent by weight.

Polymers added to the polycarbonate:
(a) ABS+SA=ABS mixed type (acrylonitrile/-butadiene/styrene=20/33/47 parts by weight) of ABS graft polymer (grafting 15 parts by weight of acrylonitrile and 35 parts by weight of styrene on 50 parts by weight of polybutadiene) and styrene/a-crylonitrile copolymer (70/30 parts by weight).
(b) BA+SA=ABS mixed type (acrylonitrile/-butadiene/styrene/methacrylic acid=24/18/57/1 parts by weight) of butadiene/acrylonitrile/methacrylic acid rubber (butadiene/acrylonitrile/methacrylic acid 63/34/3) and styrene/acrylonitrile copolymer (styrene/acrylonitrile=80/20).
(c) BS+S=BS mixed type (butadiene/styrene=24/76 parts by weight) of butadiene/styrene rubber (butadiene/styrene=80/20 parts by weight) and polystyrene.
(d) TPR/S/A=mass bead polymer of polypentenamer, styrene and acrylonitrile (polypentenamer rubber/-styrene/acrylontrile=11/67/22.
(e) S/a/B/A=polymer of polybutadiene (graft stock), styrene, a-methyl styrene and acrylonitrile (15/11/49/25 parts by weight).
(f) None=TMBPA polycarbonate used for the mixtures (see example 1) for comparison ($\overline{M}_w \approx 40\ 000$).
(g) EPDM/A/S=mass bead polymer of EPDM rubber, styrene and acrylonitrile (14/62/24 parts by weight).
(h) A/B/S/A=copolymer of a butadiene/butyl acrylate rubber and styrene/acrylonitrile copolymer (butyl acrylate/butadiene/styrene/acrylonitrile=25/11/51/13 parts by weight).

(i) BS=BS-polymer (butadiene/styrene 25/75 parts by weight) by mass bead polymerisation of polybutadiene and styrene.
(j) A/B/S/MM=polymer of polybutadiene (graft stock), acrylonitrile, styrene and methylmethacrylate (18/9/23/50 parts by weight).
(k) None=TMBPB polycarbonate used for the mixtures (see example 1) for comparison ($\overline{M}_w \approx 40\,000$).

The major proportion of the rubber in the polymer mixtures was in the form of particles measuring from 0.3 to 5.0 µm.

The table shows that the impact strength and notched impact strength of the polycarbonates may be substantially improved by mixing them with the polymers indicated. The processing temperature of the granulated polymer mixtures to produce test samples was 230°–260° C. whereas polycarbonates alone could only be processed at 310°–330° C. (see Example 1). The heat distortion temperature according to Vicat A (DIN 53 460) was higher than 140° C. in all the polymer mixtures and reached values of up to 185° C. The yield points ($\sigma_s$) (according to DIN 53 455) was 500–800 kp./cm² in the mixtures. Fracture surface of the test samples was smooth to shell-like, there were no scale-like fractures.

EXAMPLE 3

Mixtures of TMBPA-PC and BPA-polycarbonate with polystyrene and styrene/maleic acid anhydride copolymers.

Polystyrene and TMBPA-polycarbonate were together dissolved in dichloromethane and cast to form films which were dried. Films were also prepared from TMBPA-polycarbonate and styrene/maleic acid anhydride copolymer as well as from BPA/polycarbonate (BPA=2,2-bis-(4-hydroxyphenyl)-propane) and polystyrene or styrene/maleic acid copolymer (see table). The films containing TMBPA-polycarbonate were transparent and had, in each case, a freezing temperature which would be expected from completely homogeneous polymer mixtures. The films which contained BPA-polycarbonate, on the other hand, were cloudy and had practically the freezing temperature of the two starting components, indicating that the mixtures had to a large extent separated into their components (see table).

Table of example 3: Properties of polymer mixtures of polycarbonates and rubber-free styrene resins

| Polymer mixture | (Parts by weight) | Appearance of film | FT (°C.) | Elongation at break (%) |
|---|---|---|---|---|
| PS/TMBPA-PC | 100/0 | transparent | 85 | 1 |
|  | 80/20 | " | 107 | 5 |
|  | 50/50 | " | 141 | 46 |
|  | 20/80 | " | 169 | 86 |
|  | 0/100 | " | 210 | 97 |
| PSM/TMBPA-PC | 100/0 | " | 128 |  |
|  | 80/20 | " | 138 | — |
|  | 60/40 | " | 149 | — |
| PS/BPA-PC | 80/20 | cloudy,separated | 93, 146 | — |
|  | 50/50 | " | 92, 146 | — |
|  | 20/80 | " | 93, 148 | — |
|  | 0/100 | transparent | 150 | — |
| PSM/BPA-PC | 60/40 | cloudy, separated | 130/148 | — |

PS = polystyrene, PSM = polystyrene/maleic acid anhydride copolymer (styrene/maleic acid anhydride = 89/11 parts by weight); FT = freezing temperature by differential thermo analysis; elongation at break according to DIN 53 455, TMBPA-PC and BPA-PC with $M_w$ at 40 000.

EXAMPLE 4

Stability to saponification and susceptibility to stress cracking.

The table shows with the aid of a few examples, that both the mixtures according to this invention and the polycarbonates contained in them are very resistant to saponification. Furthermore, the reduced susceptibility to stress cracking of the polymer mixtures compared with that of the polycarbonates (e.g. in hot aqueous solution, concentrated aqueous ammonia solution and organic solvents) is demonstrated with the aid of the examples showing the stability to hot aqueous solutions and aqueous ammonia solution.

Table of example 4: Saponification stability and susceptibility to stress cracking

| Polymers | TMBPA/ PC | TMDKBP/ PC | TMBPB/ PC | Mixtures from example | | | | | |
|---|---|---|---|---|---|---|---|---|---|
|  |  |  |  | 1 b | 1 c | 1 e | 2 a | 2 c | 2 i |
| Changes in ST rods at 500 hours' storage in: |  |  |  |  |  |  |  |  |  |
| H₂O/100° C. | is | u | is | u | u | u | u | u | u |
| 10% aqueous NaOH/100° C. | u | u | is | u | u | u | u | u | u |
| 10% aqueous HCl/100° C. | u | is | u | u | u | u | u | u | u |
| concentrated aqueous NH₄OH/25° C. | is | is | ms | u | u | u | u | u | u | u = unchanged, is = individual small stress cracks, ms = many large stress cracks, ST-rod = standard test rod 0.4 cm × 0.6 cm × 5.0 cm.

EXAMPLE 5

Influence of the quantity of rubber and particle size of the rubber on the properties of the polymer mixtures.

Polymer mixtures (see table) were prepared as described in example 1 from TMBPA-polycarbonate, two ABS polymers of 30% by weight polybutadiene, 49% by weight styrene and 21% by weight acrylonitrile (spherical rubber particles, particle diameter of the major proportion of the rubber of one ABS polymer 0.4–0.5 and of the other ABS polymer 0.1 µm) and two other ABS polymers of 80% by weight of polybutadiene, 14% by weight of styrene and 6% by weight of acrylonitrile (spherical rubber particles, particle diameter of the major proportion of rubber of one ABS polymer 0.4–0.5 and of the other ABS polymer 0.1 μm). The test samples were used to determine the properties indicated in the table. It was found that for a given particle size of the rubber, both the notched impact strength and the weld line strength improved with increasing rubber content while the surface gloss of the injection mould parts slightly decreased. It was also found that for a given rubber content, the surface gloss of the test samples improves with increasing proportion of very finely divided rubber.

Table of example 5: Properties of polymer mixtures having differing rubber contents and rubber particle sizes

| Polymer mixture | Composition of the polymer mixture of (parts by weight): | | | | | Proportion of rubber in the polymer mixture (% by weight) | | NIS (cm.kp./cm$^2$) | WLS (cm.kp./cm$^2$) | Gloss | E-modulus (kp/cm$^2$) |
|---|---|---|---|---|---|---|---|---|---|---|---|
| | TMBPA PC | ABS I | ABS II | ABS III | ABS IV | coarse particles | finely divided | | | | |
| a | 70 | 30 | — | — | — | 9 | — | 12 | 8 | g | 22 000 |
| b | 70 | 30 | — | 15 | — | 21 | — | 17 | 11 | m | 18 000 |
| c | 70 | 30 | — | — | 15 | 9 | 12 | 15 | 9 | g | 18 000 |
| d | 70 | — | 30 | — | 15 | — | 21 | 13 | 6 | v.g | 18 000 | m = medium, g = good, v.g = very good, NIS = notched impact strength according to DIN 53 453; E-modulus according to DIN 53 455
ABS I = containing 30% of coarse rubber particles (for details see above)
ABS II = containing 30% of finely divided rubber (for details see above)
ABS III = containing 80% of coarse rubber particles (for details see above)
ABS IV = containing 80% of finely divided rubber (for details see above)
WLS = weld line strength (for definition see below)

Definition of weld line strength

Figure 1:
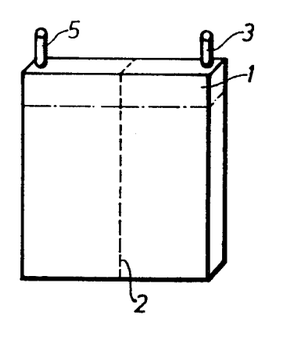

In complicated injection moulded articles such as grids, weld lines occur where molten polymer flowing from different directions meets and welds. These lines are often detectable with the naked eye, and the mechanical strength of the articles, specially their impact strength, is generally greatly reduced at these lines because they have the effect of a notch. To determine the impact strength along such lines, the impact strength according to DIN 53 453 of test specimens (4×6×50 mm) which have a weld line in the middle (seam 6 mm in width) is measured. The test specimens required for this test are sawn out of injection-moulded parts (only one specimen from each part). These specimens are shown in FIG. 1, where the reference numeral 1 indicates the standard test rod which is to be cut out, 2 indicates the weld line and 3 the sprues which are later removed.

EXAMPLE 6

Properties of BPA polycarbonate/ABS mixtures for comparison.

Polymer mixtures were prepared as in Examples 1b and 2a, in which the TMBPA-polycarbonate was replaced by BPA-polycarbonate ($\overline{M}_w \approx 40{,}000$). It was found that the same mixing temperatures and processing temperatures were required. It was also found that the heat distortion temperature and saponification stability of these products were considerably lower than those of the mixtures according to the invention which contain polycarbonates based on o,o,o',o'-tetramethyl-substituted bisphenols. Thus, the heat distortion temperatures obtained were only 130° and 135° C. (according to Vicat A, DIN 53 460). Upon 500 hours' storage in concentrated ammonia solution (as in Example 4), the test specimens were partly degraded and brittle. The yield points ($\delta_s$) (according to DIN 53 455) of the mixtures containing bisphenol-A-polycarbonate were much lower, at 410 kp/cm$^2$ (corresponding to 1b) and 450 kp/cm$^2$ (corresponding to 2a) than those of the mixtures based on TMBPA polycarbonate, which were 540 kp/cm$^2$ (1b) and 590 kp/cm$^2$ (2a).

EXAMPLE 7

Weld line strength of polymer mixtures

Polymer mixtures having the compositions shown in the table were prepared as described in Example 1. The weld line strengths (WLS) were determined as described in Example 5.

| Example 7 | Components of mixture in parts by weight → | | | | | | | WLS cm.kp/cm$^2$ | WLS in % of the CSS of the PC component |
|---|---|---|---|---|---|---|---|---|---|
| | TMBPA/PC from example 1 | BPA/PC from example 6 | ABS → from example 2b | from example 1 | from example 2a | BS from example 2i | PST from example 3 | | |
| a | 50 | | 50 | | | | | 12 | 92 |
| b | 40 | | 60 | | | | | 15 | 115 |
| c | 30 | | 70 | | | | | 22 | 170 |
| d | 20 | | 80 | | | | | 29 | 220 |
| e | 50 | | | 50 | | | | 10 | 77 |
| f | 40 | | | 60 | | | | 13 | 100 |
| g | 30 | | | 70 | | | | 30 | 150 |
| h | 50 | | | | 50 | | | 7 | 54 |
| i | 40 | | | | 60 | | | 9 | 69 |
| j | 30 | | | | 70 | | | 12 | 92 |
| k | 20 | | | | 80 | | | 14 | 108 |
| l | 70 | | | | | | 30 | 6 | 46 |
| m | — | 70 | | | | | 30 | 2 | 2 |
| n | 100 | | | | | | | 13 | — |
| o | | 100 | | | | | | 110 | — |
| p | 50 | | | | | 50 | | 8 | 61 |

-continued

| | | | Components of mixture in parts by weight → | | | | | |
|---|---|---|---|---|---|---|---|---|---|
| | | | | ABS → | | BS | PST | | WLS |
| Example 7 | TMBPA/PC from example 1 | BPA/PC from example 6 | from example 2b | from example 1 | from example 2a | from example 2i | from example 3 | WLS cm.kp/ cm$^2$) | in % of the CSS of the PC component |
| q | 40 | | | | | 60 | | 10 | 77 |
| r | 30 | | | | | 70 | | 14 | 108 |

EXAMPLE 8

Rubber-modified polycarbonates based on o,o,o',o'-tetr-aalkyl-substituted bisphenols The polymer mixtures shown in the table were prepared in a double screw extruder at 230° C. as described in Example 1. The polymer mixtures have a substantially higher impact strength and notched impact strength than the polycarbonates. Although the dimensional stability under heat of the mixtures is only insignificantly lower than that of the polycarbonates, the temperature at which they can be made up into test specimens (240° C.) is astonishingly low. The mixing temperature and injection moulding temperature are just as high as those required for mixtures in which the only polycarbonate used is that of 2,2-bis-(4-hydroxyphenyl)-propane.

Table of Example 8: Properties of rubber-modified polycarbonates

| Mixture of the following polymers (parts by weight) | | | | Heat distortion temperature Vicat A (°C.)$^\Delta$ |
|---|---|---|---|---|
| TMBPA PC from example 1b | TMBPZ PC from example 1d | BS from example 2i | ABS + SA from example 2a | |
| | | | 100 | 90 |
| | | | 100 | 105 |
| 15 | | 85 | | 119 |
| 25 | | 75 | | 135 |
| | 15 | 85 | | 121 |
| | 25 | 75 | | 136 |
| 15 | | | 85 | 120 |
| 25 | | | 75 | 134 |
| | 15 | | 85 | 120 |
| | 25 | | 75 | 137 |

$\Delta$ = for definition see example 1

| Mixture of the following polymers (parts by weight) | | | | | | | Minimum processing temperature (°C.) |
|---|---|---|---|---|---|---|---|
| TMBPA PC from example 1b | TMBPP PC from example 1c | ABS from example 1*) | BS**) | Impact strength (cm.kp./cm$^2$)[1] | Notched impact strength (cm.kp./cm$^2$)[1] | Vicat A (°C.)[2] | |
| 100 | | | | 34 | 4 | 200 | 320 |
| | 100 | | | 31 | 3 | 195 | 320 |
| 90 | | 10 | | nb | 6 | 197 | 240 |
| 75 | | 25 | | nb | 8 | 194 | 240 |
| | 90 | 10 | | nb | 7 | 198 | 240 |
| | 75 | 25 | | nb | 9 | 195 | 240 |
| 90 | | | 10 | nb | 5 | 192 | 240 |
| 75 | | | 25 | nb | 8 | 190 | 240 |
| | 90 | | 10 | nb | 6 | 193 | 240 |
| | 75 | | 25 | nb | 8 | 190 | 240 |

*) = containing 50 percent by weight of polybutadiene
**) = graft stock as in the case of the ABS from example 1 but styrene alone is grafted (50 percent by weight) instead of styrene/acrylonitrile
[1] = for definition see example 2
[2] = for definition see example 1
nb = not broken

EXAMPLE 9

Polycarbonate-modified BS and ABS polymers

The polymer mixtures shown in the table were prepared in double screw extruders as described in Example 1. It is found that the mixtures have significantly higher heat distortion temperatures than the BS and ABS polymers used.

Table of Example 9: Heat distortion of polycarbonate-modified BS and ABS polymers

EXAMPLE 10

Mixtures of TMBPA polycarbonate with rubber-modified polymers containing differing distributions of rubber.

The polymer mixtures shown in the table were prepared as described in Example 1. TMBPA polycarbonate with a molecular weight of 40,000 was used. The mixtures were prepared using proportions of 40 parts by weight of TMBPA/PC and 60 parts by weight of the polymer shown in the table. The weld line strength was determined as described in Example 5.

Polymers added to the polycarbonate:

(a) ABS mixed type described in Example 2a, rubber particles spherical and grafted with styrene/acrylonitrile (b) ABS mixed type of Example 2b, rubber particles irregular and not grafted (c) ABS mixed type (acrylonitrile/butadiene/styrene 24/15/61 parts by weight) of ABS graft polymer (grafting 15 parts by weight of acrylonitrile and 35 parts by weight of styrene to 50 parts by weight of polybutadiene) and styrene/acrylonitrile copolymer, rubber particles spherical (d) ABS mixed type of butadiene/acrylonitrile/methacrylic acid rubber (butadiene/acrylonitrile/methacrylic acid=63/34/3 parts by weight) and styrene/acrylonitrile copolymer (styrene/acrylonitrile=80/20 80/20 parts by weight), rubber particles irregular (e) ABS mixed type of polybutadiene which has been slightly grafted with styrene/acrylonitrile (16 parts by weight of styrene and 4 parts by weight of acrylonitrile to 80 parts by weight of polybutadiene) and styrene/acrylonitrile copolymers (acrylonitrile/styrene=72/28), rubber particles spherical, agglomerating on injection moulding.

(f) Mass bead polymer of EPDM rubber, styrene and acrylonitrile (EPDM rubber/styrene/acrylonitrile=14/24/62 parts by weight), rubber particles with styrene/acrylonitrile polymer embedded in them (rubber network structure, "raspberry structure").

(g) Mass bead polymer of Example 2d, TPR rubber particles with embedded styrene/acrylonitrile polymer (rubber network structure, "raspberry structure").

Table of Example 10: Polymer mixtures with differing rubber distribution

| Example | Polymer added to polycarbonate (60 parts by weight) | Rubber in mixture (percent by weight) | Form and size of rubber particles | WLS (cm.kp./cm²) | Gloss |
|---|---|---|---|---|---|
| a | ABS + SAN | 20 | spherical 0.3–0.6 μm | 10 | 3 |
| b | BA + SAN | 17 | irregular 0.3–2 μm | 14 | 4 |
| c | ABS + SAN | 9 | spherical 0.3–0.6 μm | 5 | 2 |
| d | BA + SAN | 9 | irregular 0.3–2 μm | 7 | 3 |
| e | ABS + SAN | 9 | spherical/agglomerated* | 8 | 1 |
| f | EPDM − SAN | 8 | network structure 0.3–3 μm | 7 | 2 |
| g | TPR − SAN | 7 | network structure 0.3–3 μm | 7 | 2 |

Polymer mixtures containing 40 parts by weight of TMBPA PC
1 = high gloss, 2 = gloss, 3 = medium gloss, 4 = matt
WLS = weld line strength, x = particle size 0.1–0.15μm, agglomerates 0.5–2 μm

EXAMPLE 11

Comparison of the weld line strength of polymer mixtures containing BPA polycarbonate and TMBPA polycarbonate.

The polymer mixtures shown in the table were prepared as described in Example 1. TMBPA-PC was used as in Example 1 and BPA-PC as in Example 6. The weld line strength was determined as described in Example 5.

Polymers added to the polycarbonate:
PST=polystyrene from Example 3
BS I=butadiene/styrene mass bead polymer from Example 2i
BS II=BS obtained from a butadiene/styrene rubber grafted with a small proportion of styrene (butadiene/styrene in rubber=90/10 parts by weight) mixed with polystyrene; rubber particles approximately 0.1–0.15 μm, agglomerating on injection moulding; agglomerants 0.5–2 μm, rubber content 25 percent by weight
ABS I=ABS polymer from Example 2a
ABS II=ABS polymer from Example 2b

| Example | Components of the mixture in parts by weight | | | | | | | WLS (cm.kp./cm²) | WLS of mixture/ WLS of polycarbonate (%) |
|---|---|---|---|---|---|---|---|---|---|
| | BPA-PC | TMBPA-PC | PST | BS I | BS II | ABS I | ABS II | | |
| a | 70 | | 30 | | | | | 2 | 2 |
| b | | 70 | 30 | | | | | 6 | 46 |
| c | 50 | | | 50 | | | | 4 | 4 |
| d | 40 | | | 60 | | | | 5 | 5 |
| e | 30 | | | 70 | | | | 5 | 5 |
| f | | 50 | | 50 | | | | 8 | 61 |
| g | | 40 | | 60 | | | | 10 | 77 |
| h | | 30 | | 70 | | | | 14 | 108 |
| i | 50 | | | 50 | | 5 | | 5 | 5 |
| j | 30 | | | 70 | | 5 | | 5 | 5 |
| k | | 50 | | | 50 | | | 9 | 69 |
| l | | 30 | | | 70 | | | 16 | 123 |
| m | 50 | | | | | 50 | | 10 | 9 |
| n | 30 | | | | | 70 | | 14 | 13 |
| o | | 50 | | | | 50 | | 7 | 54 |
| p | | 30 | | | | 70 | | 12 | 92 |
| q | 50 | | | | | | 50 | 5 | 5 |
| r | 30 | | | | | | 70 | 6 | 6 |
| s | | 50 | | | | | 50 | 12 | 92 |
| t | | 30 | | | | | 70 | 22 | 169 |

WLS = weld line strength
WLS of BPA-PC = 110 cm.kp./cm²
WLS of TMBPA-PC = 13 cm.kp./cm2

EXAMPLE 13

Comparison of notched impact strength and weld line strength of polymer mixtures containing BPA polycarbonate and TMBPA polycarbonate.

The polymer mixtures shown in the table were prepared as described in Example 1. TMBPA polycarbonate was used as in Example 1 and BPA polycarbonate as in Example 6. The notched impact strength was determined according to DIN 53 453. The weld line strength (CSS) was determined as described in Example 5. The values for notched impact strength and CSS indicate that the components are much more compatible with each other in the mixtures containing TMBPA polycarbonate than in the mixtures containing BPA polycarbonate.

| Example | Mixing components in parts by weight | | ABS from example 2 | Notched impact strength (cm.kp./cm$^2$) | WLS (cm.kp./cm$^2$) |
| --- | --- | --- | --- | --- | --- |
| | BPA-PC | TMBPA-PC | | | |
| a | 40 | | 60 | 7 | 7 |
| b | 50 | | 50 | 8 | 6 |
| c | 60 | | 40 | 14 | 6 |
| d | 70 | | 30 | 22 | 7 |
| e | | 40 | 60 | 12 | 16 |
| f | | 50 | 50 | 10 | 12 |
| g | | 60 | 40 | 8 | 10 |
| h | | 70 | 30 | 7 | 7 |

We claim:

1. A thermoplastic moulding composition which comprises (1) 10 to 95% by weight of an aromatic polycarbonate having a molecular weight of 10,000 to 200,000 in which at least 50% of the recurrent structural units in the linear chains are of the formula in which R is $C_1$–$C_3$ alkyl and X is $C_1$–$C_{10}$ alkylene, $C_1$–$C_{10}$ alkylidene, $C_5$–$C_{15}$ cycloalkylene, $C_5$–$C_{15}$ cycloalkylidene or and (2) 5 to 90% by weight of a member selected from the group consisting of (a) a thermoplastic resin based on (i) styrene, α-methylstyrene, α-chlorostyrene, p-chlorostyrene, 2,4-dichlorostyrene, p-methylstyrene, 3,4-dimethylstyrene, o- and p-divinyl benzene, p-methyl-α-methylstyrene, p-chloro-α-methylstyrene or a mixture thereof or (ii) styrene, α-methylstyrene, α-chlorostyrene, p-chlorostyrene, 2,4-dichlorostyrene, p-methylstyrene, 3,4-dimethylstyrene, o- and p-divinyl benzene, p-methyl-α-methylstyrene, p-chloro-α-methylstyrene or a mixture thereof together with at least one monomer selected from the group consisting of nitriles and esters of acrylic and methacrylic acid;

(b) a rubber based on a conjugated diene having 4–8 carbon atoms, a rubber based on said conjugated diene and copolymerized styrene, acrylonitrile or acrylic acid ester, a polyalkenamer rubber or an ethylene-propylene-diene rubber, (c) a graft polymer of the monomers of (a) onto the rubbers of (b) and (d) a mixture of at least two of components (a), (b) and (c).

2. A thermoplastic moulding composition as claimed in claim 1 in which the recurrent structural units are based on bis-(3,5-dimethyl-4-hydroxyphenyl)-methane; 2,2-bis-(3,5-dimethyl-4-hydroxyphenyl)-propane; 2,4-bis-(3,5-dimethyl-4-hydroxyphenyl)-2-methyl-butane; 1,1-bis-(3,5-dimethyl-4-hydroxyphenyl)-cyclohexane or α,α'-bis-(3,5-dimethyl-4-hydroxyphenyl)-p-diisopropyl benzene.

3. A thermoplastic moulding composition as claimed in claim 1 in which said aromatic polycarbonate comprises up to 50% of its structural units based on 2,2-bis-(4-hydroxyphenyl)-propane; 2,2-bis-(3,5-dichloro-4-hydroxyphenyl)-propane; 2,2-bis-(3,5-dibromo-4-hydroxyphenyl)-propane or α,α'-bis-(4-hydroxyphenyl)-p-diisopropyl benzene.

4. A thermoplastic moulding composition as claimed in claim 1 wherein the polycarbonate is branched by the incorporation of 0.05 to 2.0 mol % of a polyhydroxyl compound, based on the quantity of bisphenol used, said polyhydroxyl compound containing at least three hydroxyl groups.

5. A thermoplastic moulding composition as claimed in claim 1 wherein the polycarbonate has a molecular weight of from 20,000 to 60,000.

6. A thermoplastic moulding composition as claimed in claim 1 wherein the thermoplastic resin (a) is a polymer or copolymer of at least one monomer selected from the group consisting of styrene, α-methylstyrene, acrylonitrile, methacrylonitrile and methylmethacrylate.

7. A thermoplastic moulding composition as claimed in claim 1 wherein the thermoplastic resin (a) is polystyrene or a copolymer of styrene and acrylonitrile; α-methylstyrene and acrylonitrile; styrene and methylmethacrylate; styrene, acrylonitrile and methylmethacrylate or α-methylstyrene, acrylonitrile and methylmethacrylate.

8. A thermoplastic moulding composition as claimed in claim 1 wherein the thermoplastic resin (a) is polystyrene, a copolymer of styrene and acrylonitrile or a copolymer of α-methylstyrene and acrylonitrile.

9. A thermoplastic moulding composition as claimed in claim 1 wherein the rubber (b) is polybutadiene or polyisoprene which may contain copolymerized styrene, acrylonitrile or butyl acrylate or ethylene-propylene-diene rubber or polypentenamer rubber.

10. A thermoplastic moulding composition as claimed in claim 1 wherein the rubber (b) is polybutadiene or polyisoprene which may contain copolymerized styrene, acrylonitrile or butyl acrylate.

11. A thermoplastic moulding composition as claimed in claim 1 wherein the graft polymer (c) is a graft of styrene or styrene and acrylonitrile or α-methylstyrene and acrylonitrile on polybutadiene, a graft thereof on styrene-butadiene rubber or a graft thereof on ethylene-propylene-diene rubber.

12. A thermoplastic moulding composition as claimed in claim 1 wherein the graft polymer (c) is a graft of styrene or styrene and acrylonitrile or α-methylstyrene and acrylonitrile onto polybutadiene, a graft thereof on styrene-butadiene rubber or a graft thereof on ethylene-propylene-diene rubber and the thermoplastic resin (a) is polystyrene or a copolymer of styrene and acrylonitrile or a copolymer of α-methylstyrene and acrylonitrile.

* * * * *

UNITED STATES PATENT AND TRADEMARK OFFICE
CERTIFICATE OF CORRECTION

PATENT NO. : 4,172,103
DATED : October 23, 1979
INVENTOR(S) : Serini et al

It is certified that error appears in the above-identified patent and that said Letters Patent is hereby corrected as shown below:

Column 8, line 68, change "A-H" to read --A-F--.

Column 9, line 1, change "I-L," to read --G-K,--.

Column 9, line 5, change "A-L" to read --A-K--.

Column 9, in the table at the end of Example 1, change the following under "Example", "a" to --A--, "b" to --B--, "c" to --C--, "d" to --D--, "e" to --E--, "f" to --F--, "g" to --G--, "h" to --H--, "i" to --I--, "j" to --J--, and "k" to --K--.

Column 9, at the end of Example 1 insert
--DKBP = $\alpha,\alpha'$-bis-(4-hydroxyphenyl)-p-diisopropyl benzene--.

Signed and Sealed this

Seventh Day of August 1984

[SEAL]

Attest:

GERALD J. MOSSINGHOFF

Attesting Officer

Commissioner of Patents and Trademarks